(12) United States Patent
Schmidt et al.

(10) Patent No.: US 7,922,099 B1
(45) Date of Patent: Apr. 12, 2011

(54) SYSTEM AND METHOD FOR ASSOCIATING CONTENT WITH AN IMAGE BEARING SURFACE

(75) Inventors: Christopher Schmidt, Fairfax, CA (US); Michael Handelman, Phoenix, AZ (US); Elizabeth Young, San Francisco, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 1152 days.

(21) Appl. No.: 11/322,800

(22) Filed: Dec. 30, 2005

Related U.S. Application Data

(63) Continuation-in-part of application No. 11/194,020, filed on Jul. 29, 2005, now Pat. No. 7,549,596.

(51) Int. Cl.
*G06K 19/06* (2006.01)

(52) U.S. Cl. .............. 235/494; 235/462.45; 235/462.46; 235/462.49; 235/472.01; 235/472.02; 235/472.03

(58) Field of Classification Search .............. 235/462.14, 235/472.01–472.03, 494, 462.45–462.49, 235/375
See application file for complete search history.

(56) References Cited

U.S. PATENT DOCUMENTS

| | | | |
|---|---|---|---|
| 2,182,334 A | 12/1939 | Crespo | |
| 2,932,907 A | 4/1960 | Stieber et al. | |
| 3,292,489 A | 12/1966 | Johnson et al. | |
| 3,304,612 A | 2/1967 | Proctor et al. | |
| 3,530,241 A | 9/1970 | Ellis | |
| 3,591,718 A | 7/1971 | Asano et al. | |
| 3,657,812 A | 4/1972 | Lee | |
| 3,782,734 A | 1/1974 | Krainin | |
| 3,798,370 A | 3/1974 | Hurst | |
| 3,888,311 A | 6/1975 | Cooke, Jr. | |
| 3,911,215 A | 10/1975 | Hurst et al. | |
| 3,921,165 A | 11/1975 | Dym | |
| 4,079,194 A | 3/1978 | Kley | |
| 4,220,815 A | 9/1980 | Gibson et al. | |
| 4,318,096 A | 3/1982 | Thornburg et al. | |
| 4,337,375 A | 6/1982 | Freeman | |
| 4,375,058 A | 2/1983 | Bouma et al. | |
| 4,425,099 A | 1/1984 | Naden | |
| 4,464,118 A | 8/1984 | Scott et al. | |
| 4,492,819 A | 1/1985 | Rodgers et al. | |
| 4,570,149 A | 2/1986 | Thornburg et al. | |
| 4,603,231 A | 7/1986 | Reiffel et al. | |

(Continued)

FOREIGN PATENT DOCUMENTS

CN 1142471 2/1997

(Continued)

OTHER PUBLICATIONS

British Micro, "Operating Guide to Grafpad", 1982, 28 pp.
English Translation of Patent Abstract for JP7-296387 [Retrieved Feb. 27, 2008] Retrieved Online from {Japanese} National Center for Industrial Property Information and Training's Industrail Property Digital Libaray (IPDL> <URL: http://www.inipit.go.jp/PA1/result/detail/main/wAAAkaa44DA407296387P1.htm>.

(Continued)

*Primary Examiner* — Thien M. Le
*Assistant Examiner* — Tuyen K Vo

(57) ABSTRACT

Systems and methods for associating content with an image bearing surface. In accordance with a first embodiment of the present invention, a method, operable at an electronic interactive device, comprises accessing a first image, e.g., identifying the content, on a surface, wherein the surface comprises an encoded pattern of location information on the surface for providing location information to the electronic interactive device. The method further comprises decoding the first image to associate the location information with second image information, e.g., of the content, of a second image on the surface.

30 Claims, 7 Drawing Sheets

U.S. PATENT DOCUMENTS

| | | |
|---|---|---|
| 4,604,058 A | 8/1986 | Fisher et al. |
| 4,604,065 A | 8/1986 | Frazer et al. |
| 4,619,539 A | 10/1986 | Kageyama |
| 4,627,819 A | 12/1986 | Burrows |
| 4,630,209 A | 12/1986 | Saito et al. |
| 4,650,926 A | 3/1987 | Nakamura et al. |
| 4,686,332 A | 8/1987 | Greanias et al. |
| 4,706,090 A | 11/1987 | Hashiguchi et al. |
| 4,739,299 A | 4/1988 | Eventoff et al. |
| 4,748,318 A | 5/1988 | Bearden et al. |
| 4,787,040 A | 11/1988 | Ames et al. |
| 4,793,810 A | 12/1988 | Beasley, Jr. |
| 4,839,634 A | 6/1989 | More et al. |
| 4,841,387 A | 6/1989 | Rindfuss |
| 4,853,494 A | 8/1989 | Suzuki |
| 4,853,498 A | 8/1989 | Meadows et al. |
| 4,853,499 A | 8/1989 | Watson |
| 4,880,968 A | 11/1989 | Kwang-Chien |
| 4,913,463 A | 4/1990 | Tlapek et al. |
| 4,922,061 A | 5/1990 | Meadows et al. |
| 4,924,387 A | 5/1990 | Jeppesen |
| 4,964,167 A | 10/1990 | Kunizawa et al. |
| 4,972,496 A | 11/1990 | Sklarew |
| 4,990,093 A | 2/1991 | Frazer et al. |
| 4,991,987 A | 2/1991 | Holloway et al. |
| 5,007,085 A | 4/1991 | Greanias et al. |
| 5,030,117 A | 7/1991 | Delorme |
| 5,053,585 A | 10/1991 | Yaniger |
| 5,057,024 A | 10/1991 | Sprott et al. |
| 5,059,126 A | 10/1991 | Kimball |
| 5,113,178 A | 5/1992 | Yasuda et al. |
| 5,117,071 A | 5/1992 | Greanias et al. |
| 5,128,525 A | 7/1992 | Stearns et al. |
| 5,149,919 A | 9/1992 | Greanias et al. |
| 5,157,384 A | 10/1992 | Greanias et al. |
| 5,168,147 A | 12/1992 | Bloomberg |
| 5,184,003 A | 2/1993 | McMillin et al. |
| 5,194,852 A | 3/1993 | More et al. |
| 5,209,665 A | 5/1993 | Billings et al. |
| 5,217,376 A | 6/1993 | Gosselin |
| 5,217,378 A | 6/1993 | Donovan |
| 5,220,136 A | 6/1993 | Kent |
| 5,220,649 A | 6/1993 | Forcier |
| 5,221,833 A | 6/1993 | Hecht |
| 5,250,930 A | 10/1993 | Yoshida et al. |
| 5,260,697 A | 11/1993 | Barrett et al. |
| 5,294,792 A | 3/1994 | Lewis et al. |
| 5,301,243 A | 4/1994 | Olschafskie et al. |
| 5,314,336 A | 5/1994 | Diamond et al. |
| 5,356,296 A | 10/1994 | Pierce et al. |
| 5,401,916 A | 3/1995 | Crooks |
| 5,406,307 A | 4/1995 | Hirayama et al. |
| 5,409,381 A | 4/1995 | Sundberg et al. |
| 5,413,486 A | 5/1995 | Burrows et al. |
| 5,417,575 A | 5/1995 | McTaggart |
| 5,438,168 A | 8/1995 | Wolfe et al. |
| 5,438,662 A | 8/1995 | Randall |
| 5,466,158 A | 11/1995 | Smith, III |
| 5,474,457 A | 12/1995 | Bromley |
| 5,480,306 A | 1/1996 | Liu |
| 5,484,292 A | 1/1996 | McTaggart |
| 5,485,176 A | 1/1996 | Ohara et al. |
| 5,509,087 A | 4/1996 | Nagamine |
| 5,510,606 A | 4/1996 | Worthington et al. |
| 5,517,579 A | 5/1996 | Baron et al. |
| 5,520,544 A | 5/1996 | Manico et al. |
| 5,561,446 A | 10/1996 | Montlick |
| 5,572,651 A | 11/1996 | Weber et al. |
| 5,574,519 A | 11/1996 | Manico et al. |
| 5,574,804 A | 11/1996 | Olschafskie et al. |
| 5,575,659 A | 11/1996 | King et al. |
| 5,596,698 A | 1/1997 | Morgan |
| 5,604,517 A | 2/1997 | Filo |
| 5,624,265 A | 4/1997 | Redford et al. |
| 5,629,499 A | 5/1997 | Flickinger et al. |
| 5,635,726 A | 6/1997 | Zavislan et al. |
| 5,636,995 A | 6/1997 | Sharpe, III et al. |
| 5,640,193 A | 6/1997 | Wellner |
| 5,649,023 A | 7/1997 | Barbara et al. |
| 5,652,412 A | 7/1997 | Lazzouni et al. |
| 5,652,714 A | 7/1997 | Peterson et al. |
| 5,661,506 A | 8/1997 | Lazzouni et al. |
| 5,663,748 A | 9/1997 | Huffman et al. |
| 5,666,214 A | 9/1997 | MacKinlay et al. |
| 5,686,705 A | 11/1997 | Conroy et al. |
| 5,694,102 A | 12/1997 | Hecht |
| 5,697,793 A | 12/1997 | Huffman et al. |
| 5,698,822 A | 12/1997 | Haneda et al. |
| 5,717,939 A | 2/1998 | Bricklin et al. |
| 5,730,602 A | 3/1998 | Gierhart et al. |
| 5,739,814 A | 4/1998 | Ohara et al. |
| 5,757,361 A | 5/1998 | Hirshik |
| 5,760,773 A | 6/1998 | Berman et al. |
| 5,767,457 A | 6/1998 | Gerpheide et al. |
| 5,788,508 A | 8/1998 | Lee et al. |
| 5,790,114 A | 8/1998 | Geaghan et al. |
| 5,801,687 A | 9/1998 | Peterson et al. |
| 5,835,726 A | 11/1998 | Shwed et al. |
| 5,844,483 A | 12/1998 | Boley |
| 5,847,698 A | 12/1998 | Reavey et al. |
| 5,852,434 A | 12/1998 | Sekendur |
| 5,855,483 A | 1/1999 | Collins et al. |
| 5,877,458 A | 3/1999 | Flowers |
| 5,889,506 A | 3/1999 | Lopresti et al. |
| 5,896,403 A | 4/1999 | Nagasaki et al. |
| 5,902,968 A | 5/1999 | Sato et al. |
| 5,903,729 A | 5/1999 | Reber et al. |
| 5,910,009 A | 6/1999 | Leff et al. |
| 5,913,629 A | 6/1999 | Hazzard |
| 5,914,707 A | 6/1999 | Kono |
| 5,932,863 A | 8/1999 | Rathus et al. |
| 5,933,829 A | 8/1999 | Durst et al. |
| 5,945,656 A | 8/1999 | Lemelson et al. |
| 5,951,298 A | 9/1999 | Werzberger |
| 5,957,697 A | 9/1999 | Iggulden et al. |
| 5,960,124 A | 9/1999 | Taguchi et al. |
| 5,963,199 A | 10/1999 | Kato et al. |
| 5,963,208 A | 10/1999 | Dolan et al. |
| 5,973,420 A | 10/1999 | Kaiserman et al. |
| 5,974,558 A | 10/1999 | Cortopassi et al. |
| 5,978,773 A | 11/1999 | Hudetz et al. |
| 5,992,817 A | 11/1999 | Klitsner et al. |
| 5,997,309 A | 12/1999 | Metheny et al. |
| 6,000,613 A | 12/1999 | Hecht et al. |
| 6,000,621 A | 12/1999 | Hecht et al. |
| 6,002,387 A | 12/1999 | Ronkka et al. |
| 6,008,799 A | 12/1999 | Van Kleeck |
| 6,009,393 A | 12/1999 | Sasaki |
| 6,018,656 A | 1/2000 | Shirai |
| 6,020,895 A | 2/2000 | Azami |
| 6,021,306 A | 2/2000 | McTaggart |
| 6,041,215 A | 3/2000 | Maddrell et al. |
| 6,050,735 A | 4/2000 | Hazzard |
| 6,052,117 A | 4/2000 | Ohara et al. |
| 6,064,855 A | 5/2000 | Ho |
| 6,072,476 A | 6/2000 | Harada et al. |
| 6,076,734 A | 6/2000 | Dougherty et al. |
| 6,076,738 A | 6/2000 | Bloomberg et al. |
| 6,081,261 A | 6/2000 | Wolff et al. |
| 6,088,023 A | 7/2000 | Louis et al. |
| 6,089,943 A | 7/2000 | Lo |
| 6,094,197 A | 7/2000 | Buxton et al. |
| 6,100,877 A | 8/2000 | Chery et al. |
| 6,104,387 A | 8/2000 | Chery et al. |
| 6,104,388 A | 8/2000 | Nagai et al. |
| 6,119,944 A | 9/2000 | Mulla et al. |
| 6,124,851 A | 9/2000 | Jacobson |
| 6,130,666 A | 10/2000 | Persidsky |
| 6,144,371 A | 11/2000 | Clary et al. |
| 6,148,173 A | 11/2000 | Bell |
| 6,164,534 A | 12/2000 | Rathus et al. |
| 6,164,541 A | 12/2000 | Dougherty et al. |
| 6,181,329 B1 | 1/2001 | Stork et al. |
| 6,183,262 B1 | 2/2001 | Tseng |
| 6,188,983 B1 | 2/2001 | Hanson |
| 6,199,042 B1 | 3/2001 | Kurzweil |
| 6,199,048 B1 | 3/2001 | Hudetz et al. |

| Patent | Date | Inventor |
|---|---|---|
| 6,201,903 B1 | 3/2001 | Wolff et al. |
| 6,201,947 B1 | 3/2001 | Hur et al. |
| 6,208,771 B1 | 3/2001 | Jared et al. |
| 6,215,476 B1 | 4/2001 | Depew et al. |
| 6,215,901 B1 | 4/2001 | Schwartz |
| 6,218,964 B1 | 4/2001 | Ellis |
| 6,239,792 B1 | 5/2001 | Yanagisawa et al. |
| 6,241,528 B1 | 6/2001 | Myers |
| 6,252,564 B1 | 6/2001 | Albert et al. |
| 6,256,638 B1 | 7/2001 | Dougherty et al. |
| 6,262,711 B1 | 7/2001 | Cohen et al. |
| 6,262,719 B1 | 7/2001 | Bi et al. |
| 6,275,301 B1 | 8/2001 | Bobrow et al. |
| 6,295,439 B1 | 9/2001 | Bejar et al. |
| 6,297,812 B1 | 10/2001 | Ohara et al. |
| 6,297,824 B1 | 10/2001 | Hearst et al. |
| 6,304,667 B1 | 10/2001 | Reitano |
| 6,304,898 B1 | 10/2001 | Shiigi |
| 6,304,989 B1 | 10/2001 | Kraus et al. |
| 6,309,122 B1 | 10/2001 | Wang |
| 6,313,828 B1 | 11/2001 | Chombo |
| 6,322,369 B1 | 11/2001 | Patterson et al. |
| 6,330,976 B1 | 12/2001 | Dymetman et al. |
| 6,331,865 B1 | 12/2001 | Sachs et al. |
| 6,331,867 B1 | 12/2001 | Eberhard et al. |
| 6,335,727 B1 | 1/2002 | Morishita et al. |
| 6,349,194 B1 | 2/2002 | Nozaki et al. |
| 6,363,239 B1 | 3/2002 | Tutt et al. |
| 6,388,681 B1 | 5/2002 | Nozaki |
| 6,392,632 B1 | 5/2002 | Lee |
| 6,396,481 B1 | 5/2002 | Challa et al. |
| 6,405,167 B1 | 6/2002 | Cogliano |
| 6,415,108 B1 | 7/2002 | Kamishima et al. |
| 6,418,326 B1 | 7/2002 | Heinonen et al. |
| 6,421,524 B1 | 7/2002 | Padgett |
| 6,431,439 B1 * | 8/2002 | Suer et al. ............ 235/380 |
| 6,434,561 B1 | 8/2002 | Durst, Jr. et al. |
| 6,441,807 B1 | 8/2002 | Yamaguchi |
| 6,442,350 B1 | 8/2002 | Stephany et al. |
| 6,456,749 B1 | 9/2002 | Kasabach et al. |
| 6,460,155 B1 | 10/2002 | Nagasaki et al. |
| 6,473,072 B1 | 10/2002 | Comiskey et al. |
| 6,476,834 B1 | 11/2002 | Doval et al. |
| 6,493,734 B1 | 12/2002 | Sachs et al. |
| 6,502,756 B1 | 1/2003 | Fahraeus |
| 6,509,893 B1 | 1/2003 | Akhlagi et al. |
| 6,516,181 B1 | 2/2003 | Kirwan |
| 6,529,920 B1 | 3/2003 | Arons et al. |
| 6,532,314 B1 | 3/2003 | Plain et al. |
| 6,535,799 B2 | 3/2003 | Levanoni et al. |
| 6,556,188 B1 | 4/2003 | Cordner |
| 6,564,249 B2 | 5/2003 | Shiigi |
| 6,577,299 B1 | 6/2003 | Schiller et al. |
| 6,584,249 B1 | 6/2003 | Gu et al. |
| 6,587,859 B2 | 7/2003 | Dougherty et al. |
| 6,592,039 B1 | 7/2003 | Smith et al. |
| 6,593,908 B1 | 7/2003 | Borgstrom et al. |
| 6,608,618 B2 | 8/2003 | Wood |
| 6,609,653 B1 | 8/2003 | Lapstun et al. |
| 6,627,870 B1 | 9/2003 | Lapstun et al. |
| 6,628,847 B1 | 9/2003 | Kasabach et al. |
| 6,641,401 B2 | 11/2003 | Wood et al. |
| 6,644,545 B1 | 11/2003 | Lapstun et al. |
| 6,647,369 B1 | 11/2003 | Silverbrook et al. |
| 6,651,879 B2 | 11/2003 | Lapstun et al. |
| 6,661,405 B1 | 12/2003 | Flowers |
| 6,663,008 B1 | 12/2003 | Pettersson et al. |
| 6,665,490 B2 | 12/2003 | Copperman et al. |
| 6,668,156 B2 | 12/2003 | Lynch et al. |
| 6,676,411 B2 | 1/2004 | Rehkemper et al. |
| 6,678,499 B1 | 1/2004 | Silverbrook et al. |
| 6,689,966 B2 | 2/2004 | Wiebe |
| 6,724,373 B1 | 4/2004 | O'Neill, Jr. et al. |
| 6,724,374 B1 | 4/2004 | Lapstun et al. |
| 6,732,927 B2 | 5/2004 | Olsson et al. |
| 6,738,050 B2 | 5/2004 | Comiskey et al. |
| 6,738,053 B1 | 5/2004 | Borgstrom et al. |
| 6,752,557 B1 | 6/2004 | Hsieh |
| 6,755,584 B2 | 6/2004 | O'Brien et al. |
| 6,763,995 B1 | 7/2004 | Song |
| 6,771,283 B2 | 8/2004 | Carro |
| 6,773,185 B1 | 8/2004 | Hsieh |
| 6,798,403 B2 | 9/2004 | Kitada et al. |
| 6,816,702 B2 | 11/2004 | Kuntz et al. |
| 6,831,632 B2 | 12/2004 | Vardi |
| 6,847,883 B1 | 1/2005 | Walmsley et al. |
| 6,853,293 B2 | 2/2005 | Swartz et al. |
| 6,874,883 B1 | 4/2005 | Shigemura et al. |
| 6,885,878 B1 | 4/2005 | Borgstrom et al. |
| 6,886,036 B1 | 4/2005 | Santamaki et al. |
| 6,915,103 B2 | 7/2005 | Blume |
| 6,933,928 B1 | 8/2005 | Lilienthal |
| 6,938,222 B2 | 8/2005 | Hullender et al. |
| 6,940,491 B2 | 9/2005 | Carro |
| 6,947,027 B2 | 9/2005 | Lapstun et al. |
| 6,956,562 B1 | 10/2005 | O'Hara et al. |
| 6,965,454 B1 | 11/2005 | Silverbrook et al. |
| 6,966,495 B2 | 11/2005 | Lynggaard et al. |
| 6,966,777 B2 | 11/2005 | Robotham |
| 6,982,703 B2 | 1/2006 | Lapstun et al. |
| 6,985,138 B2 | 1/2006 | Charlier |
| 6,989,816 B1 | 1/2006 | Dougherty et al. |
| 7,006,116 B1 | 2/2006 | Meyers et al. |
| 7,035,583 B2 | 4/2006 | Ferrigno et al. |
| 7,068,860 B2 | 6/2006 | Kasabach et al. |
| 7,080,103 B2 | 7/2006 | Womack |
| 7,099,019 B2 | 8/2006 | Silverbrook et al. |
| 7,134,606 B2 | 11/2006 | Chou |
| 7,184,592 B2 | 2/2007 | Iga et al. |
| 7,193,618 B2 | 3/2007 | Morehouse |
| 7,202,861 B2 | 4/2007 | Lynggaard |
| 7,239,306 B2 | 7/2007 | Fahraeus et al. |
| 7,289,110 B2 | 10/2007 | Hansson |
| 7,295,193 B2 | 11/2007 | Fahraeus |
| 7,350,996 B2 | 4/2008 | Bielecki et al. |
| 7,409,089 B2 | 8/2008 | Simmons et al. |
| 7,421,439 B2 * | 9/2008 | Wang et al. ............ 1/1 |
| 7,453,447 B2 | 11/2008 | Marggraff et al. |
| 2001/0015721 A1 | 8/2001 | Byun et al. |
| 2001/0024193 A1 | 9/2001 | Fahraeus |
| 2001/0051329 A1 | 12/2001 | Lynch et al. |
| 2002/0000468 A1 | 1/2002 | Bansal |
| 2002/0001418 A1 | 1/2002 | Fahraeus et al. |
| 2002/0011989 A1 | 1/2002 | Ericson et al. |
| 2002/0021284 A1 | 2/2002 | Wiebe |
| 2002/0023957 A1 | 2/2002 | Michaelis et al. |
| 2002/0029146 A1 | 3/2002 | Nir |
| 2002/0041290 A1 | 4/2002 | LeKuch et al. |
| 2002/0044134 A1 | 4/2002 | Ericson et al. |
| 2002/0060665 A1 | 5/2002 | Sekiguchi et al. |
| 2002/0077902 A1 | 6/2002 | Marcus |
| 2002/0083101 A1 | 6/2002 | Card et al. |
| 2002/0087598 A1 | 7/2002 | Carro |
| 2002/0113802 A1 | 8/2002 | Card et al. |
| 2002/0113823 A1 | 8/2002 | Card et al. |
| 2002/0118230 A1 | 8/2002 | Card et al. |
| 2002/0120854 A1 | 8/2002 | LeVine et al. |
| 2002/0193975 A1 | 12/2002 | Zimmerman |
| 2002/0197589 A1 | 12/2002 | Wood et al. |
| 2003/0001020 A1 | 1/2003 | Kardach |
| 2003/0013073 A1 | 1/2003 | Duncan et al. |
| 2003/0013483 A1 | 1/2003 | Ausems et al. |
| 2003/0014615 A1 | 1/2003 | Lynggaard ............ 712/220 |
| 2003/0016210 A1 | 1/2003 | Soto et al. |
| 2003/0016212 A1 | 1/2003 | Lynggaard |
| 2003/0020629 A1 | 1/2003 | Swartz et al. |
| 2003/0024975 A1 | 2/2003 | Rajasekharan |
| 2003/0025951 A1 | 2/2003 | Pollard et al. |
| 2003/0028451 A1 | 2/2003 | Ananian |
| 2003/0029919 A1 | 2/2003 | Lynggaard et al. |
| 2003/0040310 A1 | 2/2003 | Barakat et al. |
| 2003/0046256 A1 | 3/2003 | Hugosson et al. |
| 2003/0052900 A1 | 3/2003 | Card et al. |
| 2003/0067427 A1 | 4/2003 | Comiskey et al. |
| 2003/0071850 A1 | 4/2003 | Geidl |
| 2003/0080948 A1 | 5/2003 | Lapstun et al. |
| 2003/0087219 A1 | 5/2003 | Berger et al. |
| 2003/0089777 A1 | 5/2003 | Rajasekharan et al. |

| | | | | | | |
|---|---|---|---|---|---|---|
| 2003/0090477 | A1 | 5/2003 | Lapstun et al. | JP | 5137846 | 6/1993 |
| 2003/0095098 | A1 | 5/2003 | Paul et al. | JP | 5217688 | 8/1993 |
| 2003/0112220 | A1 | 6/2003 | Yang et al. | JP | 6146516 | 5/1994 |
| 2003/0133164 | A1* | 7/2003 | Tsai ............................ 358/3.28 | JP | H06231466 | 8/1994 |
| 2003/0134257 | A1 | 7/2003 | Morsy et al. | JP | H08036452 | 2/1996 |
| 2003/0162162 | A1 | 8/2003 | Marggraff | JP | 1011639 | 4/1998 |
| 2003/0173405 | A1* | 9/2003 | Wilz et al. ................ 235/462.01 | JP | 11119790 | 4/1999 |
| 2003/0195820 | A1 | 10/2003 | Silverbrook et al. | JP | 2000247074 | 9/2000 |
| 2003/0208410 | A1 | 11/2003 | Silverbrook et al. | JP | 2000293303 | 10/2000 |
| 2003/0218604 | A1 | 11/2003 | Wood et al. | JP | 2001184291 | 7/2001 |
| 2004/0012198 | A1 | 1/2004 | Brotzell et al. | JP | 2002297308 | 10/2002 |
| 2004/0022454 | A1 | 2/2004 | Kasabach et al. | JP | 2003528402 | 9/2003 |
| 2004/0023200 | A1 | 2/2004 | Blume | JP | 2004503840 | 2/2004 |
| 2004/0029092 | A1 | 2/2004 | Orr et al. | JP | 2007296387 | 11/2007 |
| 2004/0039750 | A1 | 2/2004 | Anderson et al. | KR | 2002009615 | 11/2000 |
| 2004/0043365 | A1 | 4/2004 | Kelley et al. | KR | 20020033775 | 7/2002 |
| 2004/0043371 | A1 | 4/2004 | Ernst et al. | WO | 9957648 | 11/1999 |
| 2004/0084190 | A1 | 5/2004 | Hill et al. | WO | WO 00/73983 A1 | 12/2000 |
| 2004/0091842 | A1 | 5/2004 | Carro | WO | WO 01/01670 A1 | 1/2001 |
| 2004/0104890 | A1 | 6/2004 | Caldwell et al. | WO | WO 01/16691 A1 | 3/2001 |
| 2004/0121298 | A1 | 6/2004 | Creamer et al. | WO | WO 01/26032 A1 | 4/2001 |
| 2004/0140966 | A1 | 7/2004 | Marggraff et al. | WO | 0148685 | 7/2001 |
| 2004/0164975 | A1 | 8/2004 | Ho et al. | WO | 0161455 | 8/2001 |
| 2004/0167895 | A1 | 8/2004 | Carro | WO | 0167222 | 9/2001 |
| 2004/0169695 | A1 | 9/2004 | Forman | WO | 0169917 | 9/2001 |
| 2004/0202987 | A1 | 10/2004 | Scheuring et al. | WO | 0171653 | 9/2001 |
| 2004/0219501 | A1 | 11/2004 | Small et al. | WO | 0171743 | 9/2001 |
| 2004/0229195 | A1 | 11/2004 | Marggraff et al. | WO | WO 01/71473 A1 | 9/2001 |
| 2004/0259067 | A1 | 12/2004 | Cody et al. | WO | WO 01/71475 A1 | 9/2001 |
| 2005/0002053 | A1 | 1/2005 | Meador et al. | WO | WO 01/75723 A1 | 10/2001 |
| 2005/0005246 | A1 | 1/2005 | Card et al. | WO | WO 01/75773 A1 | 10/2001 |
| 2005/0013487 | A1 | 1/2005 | Clary et al. | WO | WO 01/75780 A1 | 10/2001 |
| 2005/0022130 | A1 | 1/2005 | Fabritius | WO | 0183213 | 11/2001 |
| 2005/0024346 | A1 | 2/2005 | Dupraz et al. | WO | 0186612 | 11/2001 |
| 2005/0055628 | A1 | 3/2005 | Chen et al. | WO | WO 01/95559 A1 | 12/2001 |
| 2005/0060644 | A1* | 3/2005 | Patterson ..................... 715/505 | WO | 0242894 | 5/2002 |
| 2005/0082359 | A1 | 4/2005 | Marggraff et al. | WO | 03001357 | 1/2003 |
| 2005/0083316 | A1 | 4/2005 | Brian et al. | WO | 03001475 | 1/2003 |
| 2005/0106547 | A1 | 5/2005 | Chiu | WO | 03067553 | 8/2003 |
| 2005/0131803 | A1 | 6/2005 | Lapstun et al. | WO | 03083763 | 10/2003 |
| 2005/0134926 | A1 | 6/2005 | Takezaki et al. | WO | 03094489 | 11/2003 |
| 2005/0135678 | A1 | 6/2005 | Wecker et al. | WO | 2004084190 | 9/2004 |
| 2005/0138541 | A1 | 6/2005 | Euchner et al. | | | |
| 2005/0165663 | A1 | 7/2005 | Razumov | | | |
| 2005/0188306 | A1 | 8/2005 | Mackenzie | | | |
| 2005/0208458 | A1 | 9/2005 | Smith et al. | | | |
| 2005/0211783 | A1* | 9/2005 | Chou ..................... 235/472.03 | | | |
| 2006/0033273 | A1 | 2/2006 | Marggraff et al. | | | |
| 2006/0067576 | A1 | 3/2006 | Marggraff et al. | | | |
| 2006/0067577 | A1 | 3/2006 | Marggraff et al. | | | |
| 2006/0080609 | A1 | 4/2006 | Marggraff | | | |
| 2006/0125805 | A1 | 6/2006 | Marggraff | | | |
| 2006/0126105 | A1 | 6/2006 | Sedky et al. | | | |
| 2006/0127872 | A1 | 6/2006 | Marggraff | | | |
| 2006/0146029 | A1 | 7/2006 | Diercks | | | |
| 2006/0159345 | A1 | 7/2006 | Clary et al. | | | |
| 2006/0168261 | A1 | 7/2006 | Serval et al. | | | |
| 2006/0242562 | A1* | 10/2006 | Wang et al. ................... 715/513 | | | |
| 2006/0269168 | A1 | 11/2006 | Kasabach et al. | | | |
| 2007/0003168 | A1 | 1/2007 | Oliver | | | |

FOREIGN PATENT DOCUMENTS

| | | |
|---|---|---|
| CN | 1520542 | 8/2004 |
| CN | 1655184 | 8/2005 |
| EP | 0495618 | 7/1992 |
| EP | 0519714 | 12/1992 |
| EP | 0539053 | 4/1993 |
| EP | 0697780 | 2/1996 |
| EP | 0866397 | 9/1998 |
| EP | 0973314 | 1/2000 |
| EP | 1256090 | 11/2002 |
| EP | 1256091 | 11/2002 |
| EP | 1315085 | 5/2003 |
| EP | 1416426 | 5/2004 |
| FR | 2811130 | 1/2002 |
| GB | 2202664 | 9/1988 |
| JP | 57238486 | 3/1982 |

OTHER PUBLICATIONS

Kramer, Translucent Patches-Dissolving Windows:, Nov. 02, 1994 Symposium on user interface software and technology, pp. 121-130, XP00197943.

Robertson G.G et al:,"Buttons As First Class Objects on an X Desktop", Nov. 11, 1991, UIST '91.4TH Annual Symposium on user interface software and technology. Proceedings of the ACM Symposium on user interface and technology. Hilton Head, SC, Nov. 11-13, 1991, ACM symposium on user interface software and technology, New Yo, pp. 35-44, XP000315064.

Steve Silberman, "The Hot New Medium: Paper", Apr. 2001, Wired, Issue 9.04.

Stifelman, Lisa J. Augmenting Real-World Objects: A Paper-Based Audio Notebook. 1993. Speech Research Group, MIT Media Laboratory, Cambridge MA. (124DIVCON2).

The Tools of Progress. [Jun. 19, 2001] [Retrieved Jun. 19, 2001] [Retrieved from the Internet] <URL:http://www.anoto.com/print_page.asp?cid=22> (124DIVCON2).

Web page; "Scan-A-Page or Word Lets Students Hear What They're Attempting to Read;" at URL=http://www. brighteye.com/home.htm; printed Mar. 13, 2003; 1 page. (124DIVCON2).

Web Page; "What Works: Optical Scanner Pens;" at URL=http://newsletters.fen.com/whatworks/items/ front/0,2551,1-13751-3366-3,00.html; printed Mar. 13, 2003; 2 pages.

"New Preschool Toys From Fisher-Price Give a Voice to Fun, Creativity and Interactive Play This Holiday Season", Mattel, Inc.: Investor Relations, http://www.shareholder.com/mattel/news/20000601-43282.cfm, 3pp.

"The Questron Electronic Wand;" 2 pages; Price, Stern, Sloan Publishers, Inc., Los Angeles.

* cited by examiner

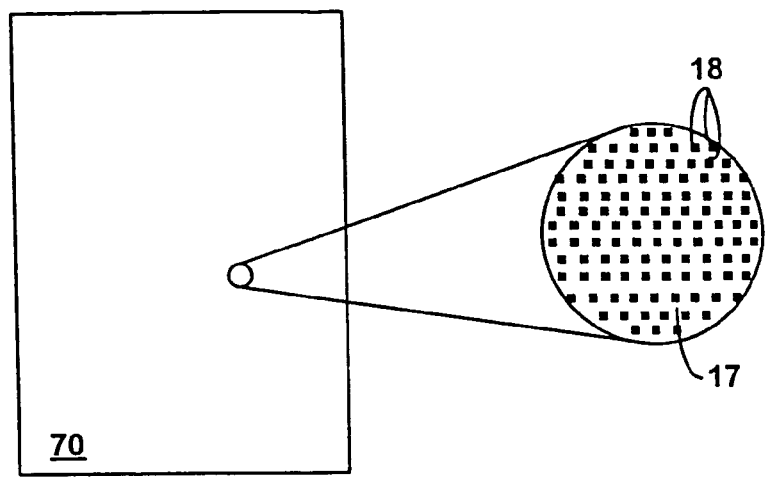
FIGURE 2
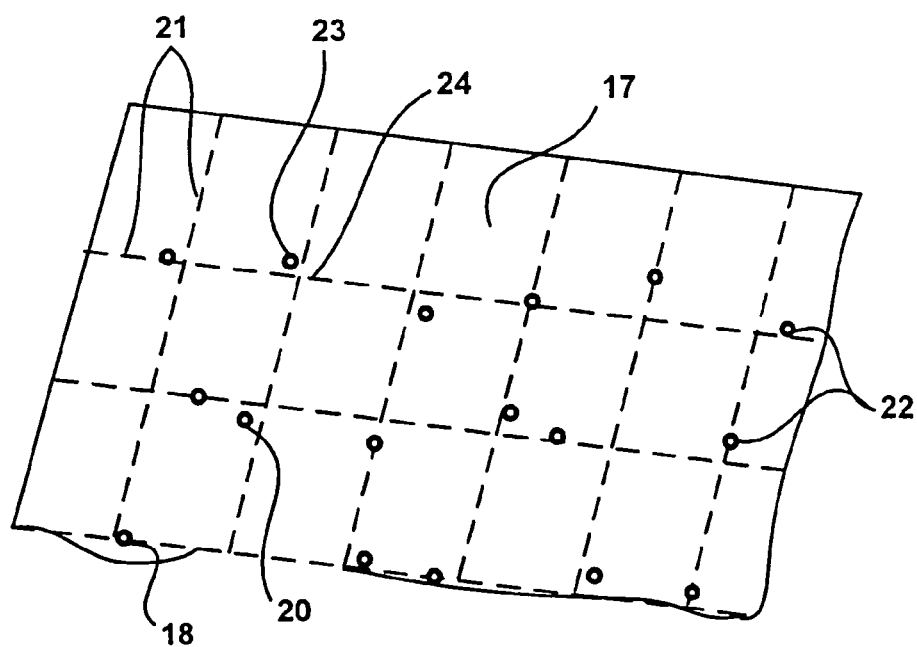
FIGURE 3

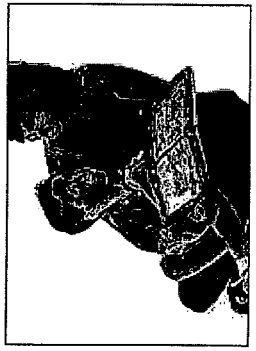
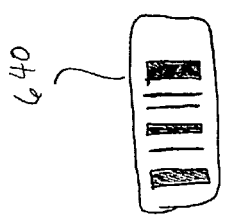
Figure 6

SYSTEM AND METHOD FOR ASSOCIATING CONTENT WITH AN IMAGE BEARING SURFACE

RELATED APPLICATIONS

This application is a Continuation In Part of co-pending, commonly owned U.S. patent application Ser. No. 11/194,020, filed Jul. 29, 2005, to Young et al., entitled "Image Bearing Surface," which is hereby incorporated by reference herein in its entirety.

This Application is related to co-pending, commonly owned U.S. patent application Ser. No. 10/803,806, filed Mar. 17, 2004, to James Marggraff et al., entitled "SCANNING APPARATUS," which is hereby incorporated by reference herein in its entirety.

This Application is related to co-pending, commonly owned U.S. patent application Ser. No. 10/861,243, filed Jun. 3, 2004, to James Marggraff et al., entitled "USER CREATED INTERACTIVE INTERFACE," which is hereby incorporated by reference herein in its entirety.

This application is related to co-pending, commonly owned U.S. patent application Ser. No. 11/034,491, filed Jan. 12, 2005, to James Marggraff et al., entitled "A METHOD AND SYSTEM FOR IMPLEMENTING A USER INTERFACE FOR A DEVICE EMPLOYING WRITTEN GRAPHICAL ELEMENTS," which is hereby incorporated by reference herein in its entirety.

This application is related to co-pending, commonly owned U.S. patent application Ser. No. 11/035,155, filed Jan. 12, 2005, to James Marggraff et al., entitled "A METHOD AND SYSTEM FOR IMPLEMENTING A USER INTERFACE FOR A DEVICE THROUGH RECOGNIZED TEXT AND BOUNDED AREAS," which is hereby incorporated by reference herein in its entirety.

This application is related to co-pending, commonly owned U.S. patent application Ser. No. 11/035,003, filed Jan. 12, 2005, to James Marggraff et al., entitled "TERMINATION EVENTS," which is hereby incorporated by reference herein in its entirety.

This application is related to co-pending, commonly owned U.S. patent application Ser. No. 11/034,489, filed Jan. 12, 2005, by James Marggraff et al., entitled "PROVIDING A USER INTERFACE HAVING INTERACTIVE ELEMENTS ON A WRITABLE SURFACE," which is hereby incorporated by reference herein in its entirety.

This application is related to co-pending, commonly owned U.S. patent application Ser. No. 11/267,785, filed Nov. 3, 2005, to James Marggraff, entitled "A REUSABLE IMAGE BEARING SURFACE AND METHOD OF MODIFYING MEMORY CONTENTS RELATED TO SAME," which is hereby incorporated by reference herein in its entirety.

FIELD OF INVENTION

Embodiments of the present invention relate to the field of interactive devices and pen based computing. More specifically, embodiments of the present invention relate to systems and methods for associating content with an image bearing surface and interactions with pen based computing.

BACKGROUND

In the last twenty years, the use of personal computing devices, such as desktop computer systems, laptop computer systems, handheld computers systems, and tablet computer systems, has grown tremendously. These personal computing devices provide users with a broad range of interactive applications, business utilities, communication abilities, and entertainment possibilities.

Current personal computing devices provide access to these interactive applications via a user interface. Typical computing devices have on-screen graphical interfaces that present information to a user using a display device, such as a monitor or display screen, and receive information from a user using an input device, such as a mouse, a keyboard, a joystick, or a stylus.

Even more so than computing systems, the use of pen and paper is ubiquitous among literate societies. While graphical user interfaces of current computing devices provide for effective interaction with many computing applications, typical on-screen graphical user interfaces have difficulty mimicking the common use of a pen or pencil and paper. For example, desktop and laptop computer systems typically do not have a pen-like interface. Moreover, input into a computer is shown on an electronic display, and is not tangible and accessible in the same manner as information written on paper or a physical surface.

Images and writings drawn with a pen-like interface on a paper surface have convenience, portability, permanence, and tangibility.

Today, interactive content, e.g., a web page, is available only through screen-based mediums such as graphical user interfaces that utilize display screens, e.g., a conventional computer display. It would be advantageous to expand the mediums over which interactive content is available for use.

SUMMARY OF THE INVENTION

Therefore, a need exists for systems and methods for associating content with an image bearing surface. A need also exists for systems and methods for associating content with an image bearing surface having qualities of paper that also satisfies the above need. A further need exists for systems and methods for associating content with an image bearing surface that is compatible and complementary with existing computers, computer peripherals and methods of web access. A need exists for using the above principles to provide paper-based interactive content usable with a pen-based computer system Accordingly, in one embodiment, a web page can be obtained, e.g., via the internet, and a copy of this web page can be printer on paper, the paper having a pre-printed dot pattern thereon providing spatial location information. Information pertaining to the web page is transferred onto a pen-based computer system. An identifier of the web page is printed on the paper copy of the web page. The identifier may be a bar code, for example. The identifier relates to the transferred information A scan of the identifier by the pen based computer system informs pen-based computer system to use the transferred information for web page interaction.

Systems and methods for associating content with an image bearing surface are disclosed. In accordance with a first embodiment of the present invention, a method, operable at an electronic interactive device, comprises accessing a first image, e.g., a bar code, on a surface, wherein the surface comprises an encoded pattern of location information on the surface for providing location information to the electronic interactive device. The method further comprises decoding the first image to associate the location information with second image information, e.g., of a web page, of a second image on the surface.

In accordance with another embodiment of the present invention, a method, operable at an electronic interactive device, comprises accessing a first image, e.g., a bar code, on a surface, wherein the surface comprises an encoded pattern of location information on the surface for providing location information to the electronic interactive device. The method further comprises decoding the first image to associate the location information with second image information, e.g., of a web page, of a second image on the surface. Responsive to the electronic interactive device accessing a portion of the second image, an action associated with the portion of the second image is performed, for example, implementing an interaction, e.g., associated with a hyperlink as indicated on the web page, by the device.

In accordance with a system embodiment of the present invention, a pen-shaped device comprises an optical detector coupled to a housing, a processor coupled to the optical sensor and a memory coupled to the processor. The memory unit comprises instructions that when executed implement a method, the method comprising accessing a first image on a surface, wherein the surface comprises an encoded pattern of location information on the surface for providing location information to the pen-shaped device and decoding the first image to associate the location information with second image information of a second image on the surface.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 2 shows an exemplary image bearing surface provided with a pattern of location determining marks, in accordance with embodiments of the present invention.

FIG. 3 shows an enlarged portion of the position code of FIG. 2, in accordance with embodiments of the present invention.

FIG. 6 illustrates an image printed on a piece of encoded paper, in accordance with an embodiment of the present invention.

DETAILED DESCRIPTION

Figure 1:
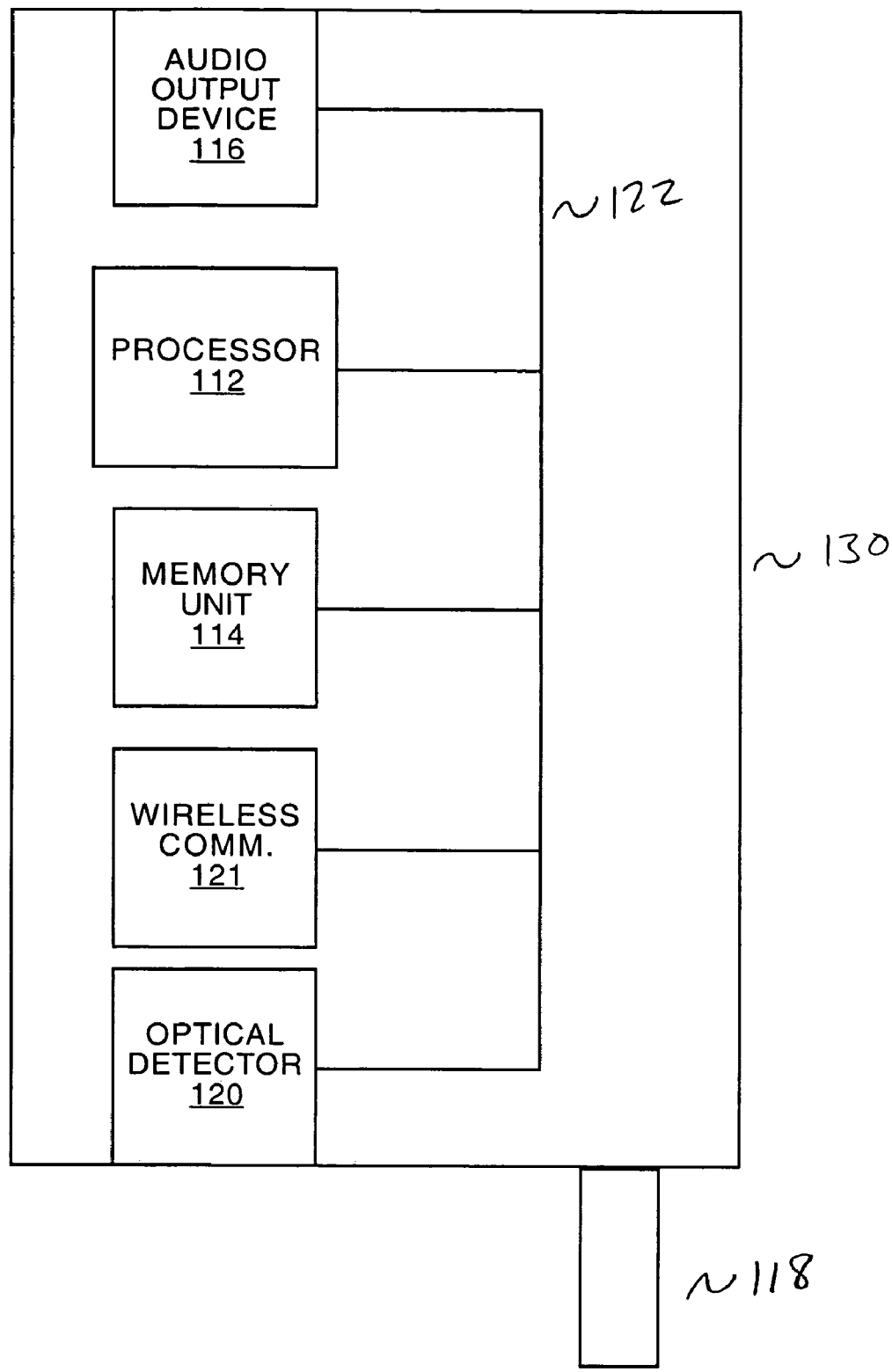
FIG. 1 illustrates an exemplary interactive device, in accordance with embodiments of the present invention.

Reference will now be made in detail to various embodiments of the invention, a reusable image bearing surface and method of modifying memory contents related to same, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. It is appreciated that throughout the present invention, discussions utilizing terms such as "recognizing" or "accessing" or "performing" or "decoding" or "recording" or "interfacing" or the like, often refer to the action and processes of an electronic system (e.g., interactive device 100 of FIG. 1), or similar electronic computing device, that manipulates and transforms data represented as physical (electronic) quantities within the electronic device's registers and memories into other data similarly represented as physical quantities within the electronic device memories or registers or other such information storage, transmission or display devices.

System and Method for Associating Content with an Image Bearing Surface

FIG. 1 illustrates an exemplary interactive device 100 for use with embodiments of the present invention, in accordance with embodiments of the present invention. The use, operation, and composition of interactive device 100 are described briefly herein, and more comprehensively in the above referenced patent applications which are incorporated by reference. Interactive device 100 includes processor 112, memory unit 114, audio output device 116, writing element 118 and optical detector 120 within housing 130. In one embodiment, processor 112, memory unit 114, audio output device 116 and optical detector 120 are communicatively coupled over bus 122. In one embodiment, optical detector 120 may also include an optical emitter. In one embodiment, housing 130 may also contain a power supply operable to power circuits and functions of interactive device 100. In one embodiment, housing 130 may also include a display and/or input buttons communicatively coupled with bus 122.

In one embodiment, housing 130 is shaped in the form of a stylus or a writing instrument (e.g., pen-like). In this embodiment, device 100 is a pen-based computer system. A user may hold interactive device 100 in a similar manner as a stylus is held. Writing element 118 is located at one end of housing 130 such that a user can place writing element 118 in contact with a writable surface (not shown). Writing element 118 may include a pen, a pencil, a marker, a crayon, chalk, or any other marking material. It should be appreciated that writing element 118 may also include a non-marking writing element such as a stylus type tip. It should also be appreciated that writing element 118 may also have magnetic properties. During use, a user can hold interactive device 100 and use it in a similar manner as a writing instrument to write on a surface with writing element 118.

Interactive device 100 allows users to create user-written selectable items that represent different functions provided by interactive device 100. In one embodiment, the user-written selectable item includes a symbol representation of an application program executable by processor 112. Computer code for recognizing such functional user-written selectable items and distinguishing them from other non-functional user-written items can reside in memory unit 114 in interactive device 100. It should be appreciated that interactive device 100 is also operable to recognize and execute functions associated with pre-printed selectable items on the surface.

Optical detector 120 is at one end of the stylus-shaped interactive device 100. Optical detector 120 is operable to detect information on a surface. In one embodiment, interactive device 100 also comprises an optical emitter for illuminating a portion of a surface that is detected by optical detector 120. The information detected by optical detector 120 is transmitted to processor 112.

Processor 112 may include any suitable electronics to implement the functions of the interactive device 100. Processor 112 can recognize the user-written selectable items and pre-printed selectable items, and can identify the locations of those user-written and pre-printed selectable items so that interactive device 100 can perform various operations. In these embodiments, memory unit 114 may comprise computer code for correlating any user-written or pre-printed selectable items with their locations on the surface.

Memory unit 114 comprises computer code for performing any of the functions of the interactive device 100. In one embodiment, wherein computer code stored in memory unit 114 and implemented on processor 112 is responsive to a user selection of a user-written or pre-printed selectable item and operable to execute a function associated with the user-written or pre-printed selectable item in response to the selection. Memory unit 114 is also operable to record information associated with user made markings on a surface.

In accordance with embodiments of the present invention, the interactive device 100 may optionally comprise wireless communications unit 121. Optional wireless communications unit 121 enables interactive device 100 to communicate wirelessly with another device, for example, a desktop or laptop computer, a handheld computer, a mobile phone and/or a wireless access point, e.g., a "hot spot." Interactive device 100 may wirelessly access content on such another device, e.g., a nearby computer, or utilize such a device to access yet another device, e.g., via a network, for example, the Internet.

FIG. 2 shows an exemplary image bearing surface 15 provided with a pattern of location determining marks, in accordance with embodiments of the present invention. In the embodiment of FIG. 2, image bearing surface 15 is provided with a coding pattern in the form of optically readable position code 17 that consists of a pattern of marks 18. The marks 18 in FIG. 2 are greatly enlarged for the sake of clarity. In actuality, the marks 18 may not be easily discernible by the human visual system, and may appear as grayscale on reusable image bearing surface 15. In one embodiment, the marks 18 are embodied as dots; however, the present invention is not so limited. In one embodiment, the dots are permanently printed on the writing surface.

FIG. 3 shows an enlarged portion 19 of the position code 17 of FIG. 2, in accordance with embodiments of the present invention. An interactive device such as interactive device 100 (FIG. 1) is positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the reusable surface 70. Thus, by matching the pattern in the image/raster with a pattern in the reference system, the position of the pattern on the surface 70, and hence the position of the optical device relative to the surface 70, can be determined.

In one embodiment, the pattern of marks on image bearing surface 15 comprises substantially invisible codes. The codes are "substantially invisible" to the eye of the user and may correspond to the absolute or relative locations of the selectable items on the page. "Substantially invisible" also includes codes that are completely or slightly invisible to the user's eye. For example, if dot codes that are slightly invisible to the eye of a user are printed all over a sheet of paper, the sheet may appear to have a light gray shade when viewed at a normal viewing distance and/or without magnification. It should be appreciated that although dot patterned codes are specifically described herein, other types of substantially invisible codes may be used in other embodiments of the invention.

Anoto, a Swedish company, employs a technology that uses an algorithm to generate a pattern the enables a very large unique data space for non-conflicting use across a large set of documents. Their pattern, if fully printed, would cover 70 trillion 8.5"×11" pages with unique recognition of any 2 cm square on any page. Paper containing the specific dot patterns is commercially available from Anoto. The following patents and patent applications are assigned to Anoto and describe this basic technology and are all herein incorporated by reference in their entirety for all purposes: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

A particular instance of an image bearing surface, e.g., image bearing surface 70 of FIG. 2, may comprise an encoded pattern of location information as described previously. The specific location information encoded into the image bearing surface, or "dot-space" of the image bearing surface, may generally be known or unknown to an interactive device, e.g., interactive device 100 (FIG. 1).

For example, an interactive device may associate a first location encoding, or "dot-space," with a first application, e.g., a game. Consequently, whenever that first location is detected, e.g., an interactive device scans a piece of paper with the first location encoding, the interactive device executes software associated with the game. In this case, the dot-space of the paper is known to the interactive device. The dot-space and/or surfaces encoding the dot-space may be known as "special purpose" surfaces.

In other cases, e.g., "general purpose" surfaces, the dot-space of the surface, e.g., paper, is not known, e.g., pre-associated, to the interactive device. For example, it is known for a user to draw, e.g., a calculator, on encoded paper representing a second location using an interactive device. In association with the actions of a user drawing the calculator (or other types of commands), the interactive device associates the second dot-space with the calculator and is able to perform calculator functions in association with the second dot-space.

Such associations among a general purpose dot-space and an application, e.g., embodied on an intelligent device, are generally not considered permanent. It is known, however, for the association to be retained, for example, until an interactive device is reset. It is to be appreciated that, in general, there are numerous instances of any given dot-space, e.g., a particular dot-space encoding can be printed on an effectively limitless number of different sheets of paper. For example, if a second piece of paper encoding the same second location information is scanned with the same interactive device, the interactive device may recall the previously established association between the second location and the calculator function, even if the second piece of paper has not been marked by a user. Such lasting associations unfortunately limit the usability of "general purpose" surfaces, e.g., encoded paper.

A vast amount of content has been and can be created in computerized databases, e.g., the word wide web. While most of this content was not originally intended for use with a pen-like interface, much of such content has application to such an interface, with numerous advantages over the traditional display screen and mouse interface.

Figure 4:
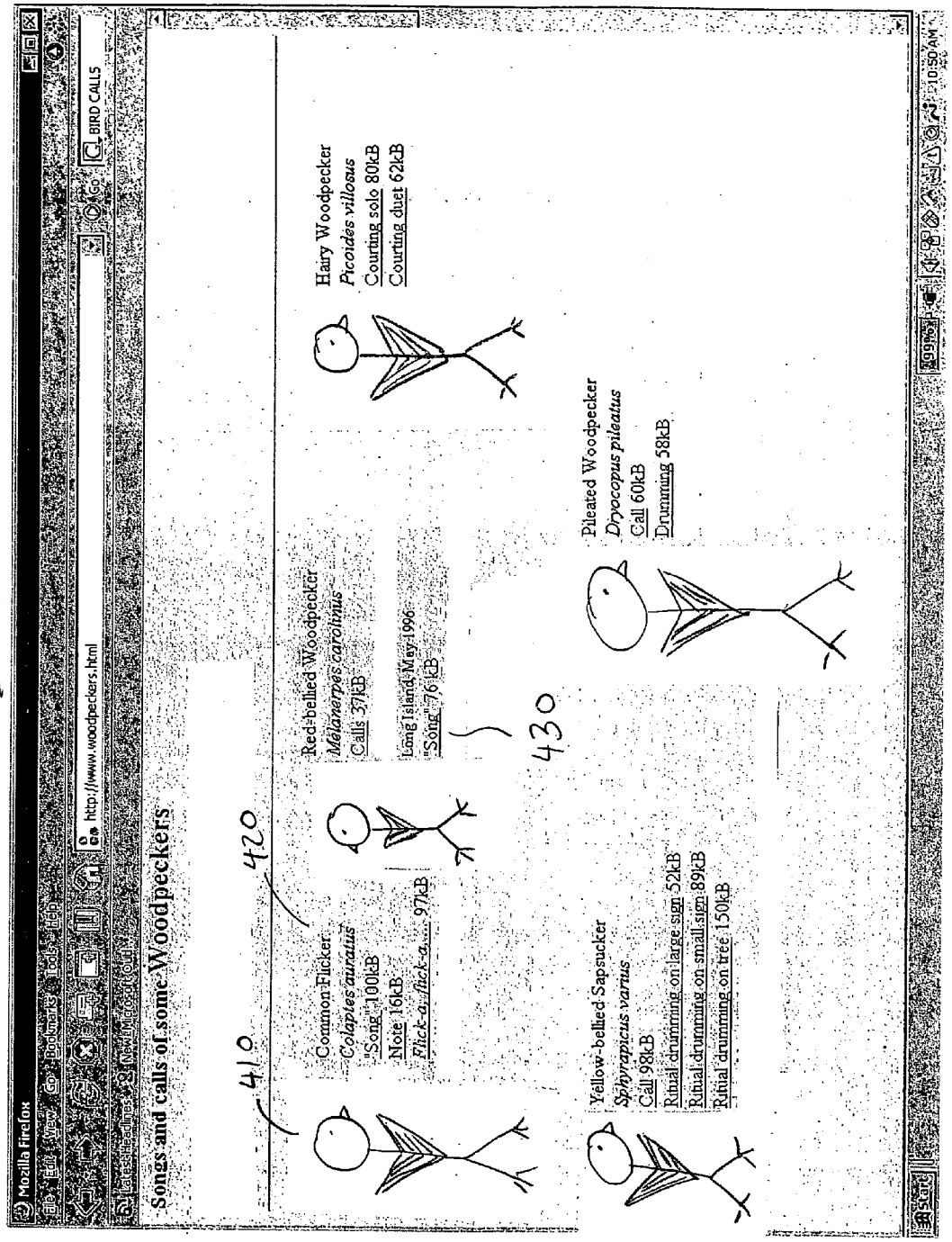
FIG. 4 is a screen capture of an exemplary web page image.

FIG. 4 is a screen capture of an exemplary web page image 400. Image 400 may be obtained for the web, for instance, and comprises pictures, e.g., picture 410, text, e.g., text 420 and links, e.g., link 430. In this particular example, the links are primarily pointers to digital audio files, e.g., recordings of woodpecker songs. In a typical application of embodiments of the present invention, image 400 may be accessed and displayed on a conventional display-based a computer coupled to the internet.

Figure 5:
FIG. 5 is a rendering of an exemplary web page image printed on a piece of encoded paper, in accordance with an embodiment of the present invention.

FIG. 5 is a rendering 500 of image 400 (FIG. 4) printed on a piece of encoded paper, in accordance with an embodiment of the present invention. For example, rendering 500 is printed via a printer attached to the computer described above. Rendering 500 comprises substantially all of the information of image 400, including, for example, pictures, text and links. For example, image 510 is a printed rendering of image 410 (FIG. 4), text 520 is a printed rendering of text 420 (FIG. 4) and link 530 is printed rendering of link 430 (FIG. 4). It is to be appreciated that the content of rendering 500 includes location encoding, e.g., via a substantially invisible encoding, such that the position of, for example, text 520 can be differentiated from the position of link 530, by an appropriate device, e.g., interactive device 100 of FIG. 1.

Embodiments in accordance with the present invention provide a pen-like interface to interact with rendering 500, in much the same manner as a person could interact, via a conventional screen-based computer, with a website represented by image 400 (FIG. 4). For example, touching on link 530 with an appropriate interactive device, e.g., one capable of audio playback, should produce an analogous effect to "clicking" on link 430 (FIG. 4). In this case, such action should play the song of a red-bellied woodpecker from the pen-based computer.

In accordance with embodiments of the present invention, an interactive device can be provided with either the content of such links, e.g., the audio files, which may be transcoded, e.g., to reduce their size, or the pointers of the links, or both. However, to perform the proper action in response to touching a link, the interactive device needs to be aware of where in dot-space a particular link resides. For example, the link needs to be associated with its dot-space. Stated differently, the dot-space on which the web page is printed needs to be associated with the digital content that is related to the web page and typically transferred to the pen-based computer.

In general, most computer-attached printing devices cannot produce output of sufficient quality to encode location information, e.g., in substantially invisible codes, in a manner that is compatible with existing encoding and decoding devices. Consequently, in the general case, an association between content rendered on a computer printer and a particular dot-space is not typically established by printing encoding dots along with the content. Typically, it is commercially infeasible to associate such printed content with particular dot-space prior to printing. For example, in the general case, an interactive device e.g., interactive device 100 of FIG. 1, cannot be told where link 530 is out of all possible dot-spaces prior to printing.

Even in a case in which a desired computer-attached printing device is capable of printing encoding dots, it is often advantageous to reuse a particular, e.g., a general purpose, dot-space. Consequently, it is desirable to associate a particular content with a particular dot space.

In general, such association is formed after printing the content onto pre-encoded paper, or other media. In accordance with an embodiment of the present invention, an interactive device can be provided partial information about printed content, for example, horizontal and vertical positions of links within a page, e.g., the horizontal and vertical position of link 530. It is to be appreciated that this information can be given or transferred to an interactive device prior to, during, or after printing of the content onto pre-encoded paper. This information can be provided, e.g., via wireless communication with an interactive device. Alternatively, this information can be provided via other means, for example, via a docking station that communicates via light pulses with optical detector 120 of interactive device 100 (FIG. 1). While information about the content of a page may be known, in general, the dot-space of the particular page is unknown.

In accordance with embodiments of the present invention, a web image, e.g., image 400 (FIG. 4) may be processed by a computer, and information, e.g., X-Y locations of links, of that web image may be sent to an interactive device. Subsequently, the interactive device associates the first location encoding that it detects with such web image. In this manner, a page or dot-space may be identified by the interactive device, and the links can be located within that dot-space by utilizing information provided by the processing computer.

In accordance with other embodiments of the present invention, a user may be instructed to write identifying information in a particular area of a page and/or to trace some set of content, e.g., a title, of a page. In this manner, a page or dot-space may be identified by the interactive device, and the links can be located within that dot-space by utilizing information provided by the processing computer.

In accordance with still other embodiments of the present invention, a processing computer may add an image to rendering 500, for example, code mark 540. Code mark 540 identifies the content of rendering 500. For example, code mark 540 may signify date and time that image 400 (FIG. 4) was processed into rendering 500 (but not necessarily the time printed). Alternatively, code mark 540 may signify the sequence of the processed image, e.g., the nth processed image.

By reading code mark 540, a page or dot-space is identified by the interactive device and associated with its particular content. Code mark 540 is an image that can be rendered by the computer-attached printer and detected by an interactive device. Examples of such codes include one- and two-dimensional bar codes of a variety of formats. In accordance with an embodiment of the present invention, code mark 540 can encode information by obscuring substantially invisible codes pre-printed onto encoded paper.

It is to be appreciated that, in accordance with embodiments of the present invention, the interactive device may not have knowledge of the content of an image prior to forming an association between an image and a particular dot-space. For example, code mark 540 may encode a universal resource locator (URL) corresponding to a printed page. Responsive to a touch in a particular location on that page, the interactive device may query that web page, e.g., wirelessly via a local computer or via a "hot spot." Such query may simulate a mouse click to be web page in the location corresponding to the touch. The interactive device may receive the web page response and react appropriately.

For example, consider a copy of rendering 500 printed on encoded paper and interactive device 100 (FIG. 1), wirelessly coupled to the internet via an 802.11 access point. Interactive device 100 has not been preloaded with any bird calls, or information of rendering 500.

A user scans code mark 540, which informs interactive device 100 that a particular 8.5 inch×11 inch portion of dot-space represents the web page located at a particular URL. Interactive device 100 may access the web page to obtain information of links, e.g., their location within the page and/or content of the links. In this manner, interactive device 100 enables a user to interact with a web page utilizing a pen-like interface, without prior knowledge of the web page in the interactive device 100. For example, a user touch onto link 530 may cause the interactive device 100 to play the call of a red-bellied woodpecker from interactive device 100's memory.

Alternatively, interactive device 100 can simulate a conventional computer/mouse interaction with the website, e.g., sending information of mouse "clicks" in response to user touches of interactive device 100 onto the encoded paper. For example, a user touch onto link 530 may cause the interactive device 100 to send a mouse "click" indication to the website, and to play the call of a red-bellied woodpecker as the content is streamed from the website to interactive device 100.

Although the previous examples have illustrated interaction with content that is primarily the reception of information, e.g., accessing and playing back woodpecker calls, embodiments in accordance with the present invention are well suited to interactions that provide information as well.

FIG. 6 illustrates an image 600 printed on a piece of encoded paper, in accordance with an embodiment of the present invention. Image 600 may be rendered from a web image, and printed onto pre-encoded paper. Alternatively, image 600 may be printed contemporaneously with substantially invisible encoding, for example, via high quality commercial printing techniques.

Image 600 comprises a code mark 640, a user name input field 610, a password field 620 and a submit button, e.g., link, 630. If image 600 were a display of a conventional website, a user would understand to type a user name into field 610, type a password into field 620 and click on submit button 630. A pen-like interaction may comprise scanning code mark 640, writing a user name in field 610, writing a password in field 620 and touching submit button 630.

Responsive to these user actions, an interactive device 100 (FIG. 1) may perform a recognition function on the user generated stroke data entered into fields 610 and 620 and send the resulting character information to a destination, e.g., a website, specified in code block 640. The sending operation may take place immediately or be queued until the interactive device 100 is able to communicate with the destination.

Figure 7:
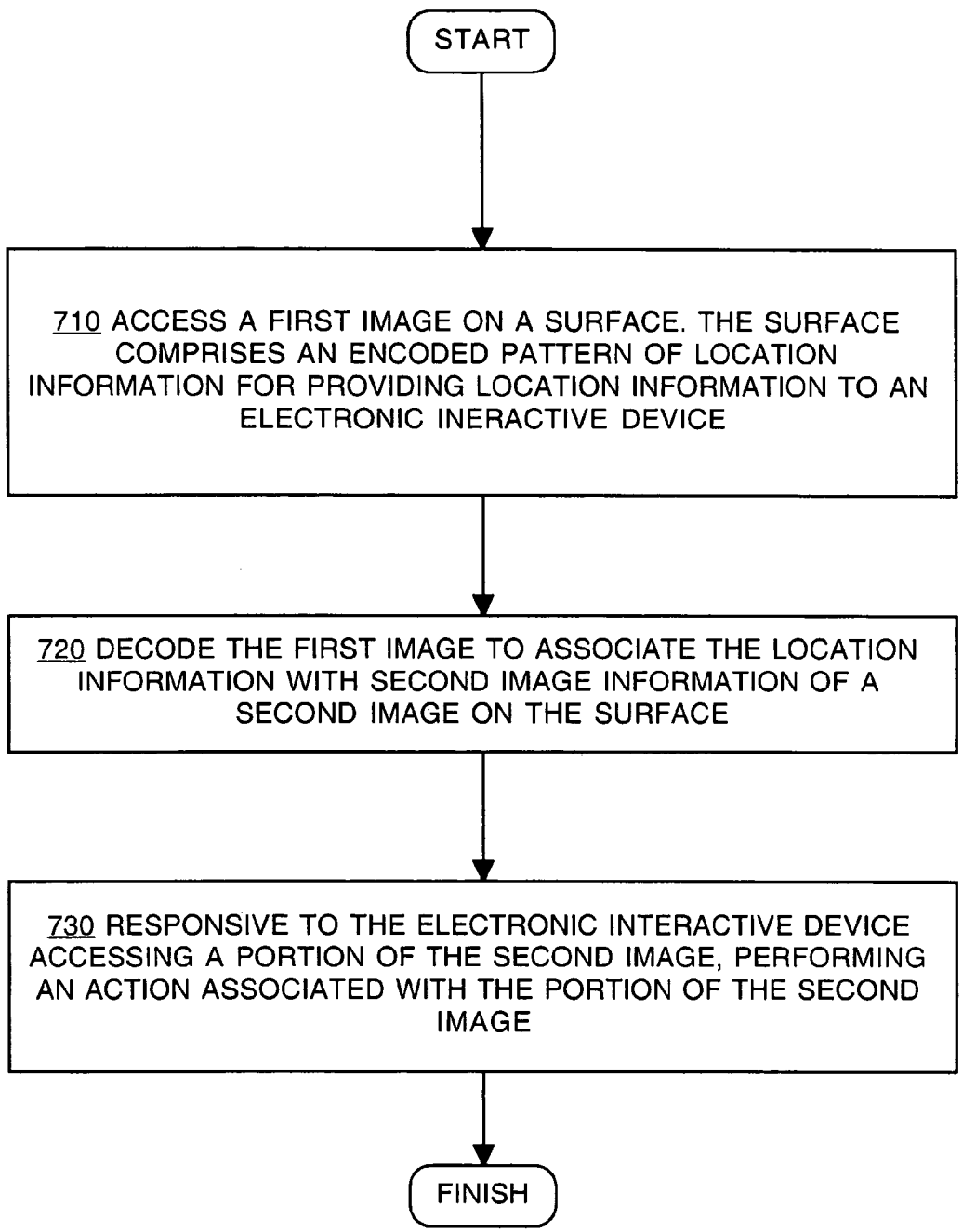
FIG. 7 is a flow diagram of a method, in accordance with embodiments of the present invention.

FIG. 7 is a flow diagram of a computer implemented method 700, in accordance with embodiments of the present invention. Method 700 may be performed at an electronic interactive device, for example, interactive device 100 of FIG. 1. In 710, a first image on a surface is accessed. For example, interactive device 100 accesses code mark 540 (FIG. 5). The surface comprises an encoded pattern of location information on the surface for providing location information to the electronic interactive device.

In 720, the first image is decoded to associate the location information with second image information of a second image, e.g., a printed rendering of a web page, on the surface. In optional 730, responsive to the electronic interactive device accessing a portion of the second image, an action associated with the portion of the second image is performed. For example, responsive to accessing link 530 (FIG. 5), the electronic interactive device may access the content associated with link 530 and play the song of the red-bellied woodpecker. The action may include a wide variety of actions, including accessing content associated with a link, e.g., a hyperlink.

In this novel manner, content printed on encoded paper may be associated with the encoded location, such that desirable interaction can be conducted utilizing a pen-like interface.

Figure 8:
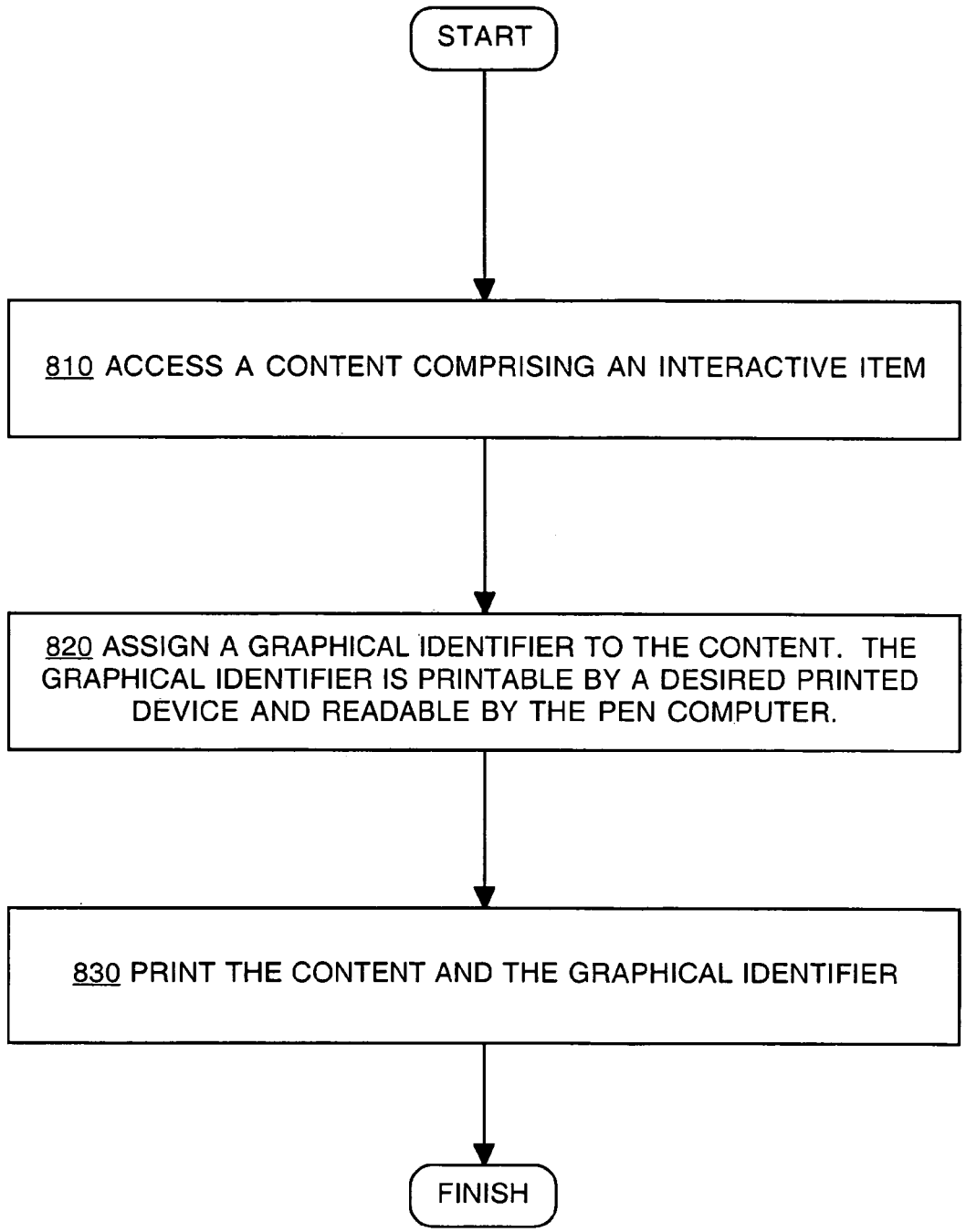
FIG. 8 is a flow diagram of a computer implemented method for preparing printed content for interaction with a pen computer, in accordance with embodiments of the present invention.

FIG. 8 is a flow diagram of a computer implemented method 800 for preparing printed content for interaction with a pen computer, in accordance with embodiments of the present invention. Method 800 may be performed at a conventional computer, e.g., a desktop computer system. In 810, content comprising an interactive item is accessed. For example, a web page is accessed. The interactive item may be a hyperlink, for example.

In 820, a graphical identifier is assigned to the content. The graphical identifier is printable by a desired printing device and readable by the pen computer. The graphical identifier may, for example, directly encode an address of the content within a database, e.g., a universal resource locator of a web page. Alternatively, for example, the graphical identifier may encode some other relation between a processing device and the content, e.g., an index relationship to information stored on the processing device.

In 830, the content and the graphical identifier are printed. For example, the content of content image 400 (FIG. 4) and the graphical identifier code mark 540 (FIG. 5) are printed onto paper encoded with a pre-printed substantially invisible code.

Embodiments in accordance with the present invention provide for associating content with an image bearing surface. Embodiments in accordance with the present invention provide also provide for systems and methods for associating content with an image bearing surface having qualities of paper. Further, embodiments in accordance with the present invention provide for systems and methods for associating content with an image bearing surface that is compatible and complementary with existing computers, computer peripherals and methods of web access.

Various embodiments of the invention, systems and methods for associating content with an image bearing surface, are thus described. While the present invention has been described in particular embodiments, it should be appreciated that the invention should not be construed as limited by such embodiments, but rather construed according to the below claims.

What is claimed is:

1. A method comprising:
   accessing a first image on a surface, wherein said surface comprises an encoded pattern of location information on said surface for providing location information to an electronic interactive device; and wherein further said encoded pattern of location information defines a portion of a dot space; and
   decoding said first image to associate said location information with second image information of a plurality of second images on said surface; wherein said first image identifies a web page comprising said plurality of second images and a plurality of memory-stored content associated with said plurality of second images; and
   associating said portion of said dot space with said web page, wherein said accessing and said decoding and associating are performed by said electronic interactive device.

2. The method of claim 1 wherein said encoded pattern is substantially invisible.

3. The method of claim 1 wherein said second image information is resident on said electronic interactive device at a time of said decoding.

4. The method of claim 1 wherein said second image information is not resident on said electronic interactive device at a time of said decoding.

5. The method of claim 1 wherein said second image information comprises an address of a source of said plurality of second images.

6. The method of claim 5 wherein said address is a universal resource locator.

7. The method of claim 1 wherein said first image encodes information by obscuring a portion of said encoded pattern.

8. The method of claim 1 wherein said second image information comprises positional information of elements of said plurality of second images.

9. A method comprising:
   accessing a first image on a surface, wherein said surface comprises an encoded pattern of location information on said surface for providing location information to an electronic interactive device; and wherein further said encoded pattern of location information defines a portion of a dot space;
   decoding said first image to associate said location information with second image information of a plurality of second image on said surface; wherein said first image identifies a web page comprising said plurality of second images and a plurality of memory-stored content associated with said plurality of second images;
   associating said portion of said dot space with said web page; and
   responsive to said electronic interactive device accessing a portion of said plurality of second images, performing an action associated with said portion of said plurality of second images, wherein said accessing, decoding, associating and performing are performed by said electronic interactive device.

10. The method of claim 9 wherein said action is to render an audio content associated with said portion of said plurality of second images.

11. The method of claim 9 wherein said action is to render an audio content associated with accessing said portion of said plurality of second images.

12. The method of claim 9 wherein said action comprises accessing content not resident on said electronic interactive device at a time of said accessing said portion of said plurality of second images.

13. The method of claim 12 wherein said accessing content comprises accessing the internet.

14. A pen-shaped device comprising:
   an optical detector coupled to a housing;
   a processor coupled to said optical sensor; and
   a memory coupled to said processor, said memory unit comprising instructions that when executed implement a method, said method comprising:
   accessing a first image on a surface, wherein said surface comprises an encoded pattern of location information on said surface for providing location information to said pen-shaped device; and wherein further said encoded pattern of location information defines a portion of a dot space; and
   decoding said first image to associate said location information with second image information of a plurality of second images on said surface; wherein said first image identifies a web page comprising said plurality of second images and a plurality of memory-stored content associated with said plurality of second images; and
   associating said portion of said dot space with said web page.

15. The pen-shaped device of claim 14 further comprising a wireless communications unit coupled to said processor for accessing said second image information.

16. The pen-shaped device of claim 14 wherein second image information is resident on said pen-shaped device at a time of said decoding.

17. The pen-shaped device of claim 15 wherein said second image information is not present on said pen-shaped device at a time of said decoding.

18. The pen-shaped device of claim 17 wherein said address is a universal resource locator.

19. The pen-shaped device of claim 14 wherein said second image information comprises an address of a source of said plurality of second images.

20. The pen-shaped device of claim 14 wherein said first image encodes information by obscuring a portion of said encoded pattern.

21. The pen-shaped device of claim 14 wherein said second image information comprises positional information of elements of said plurality of second images.

22. A method of identifying information, said method comprising:
   scanning a first image printed on a surface, wherein said surface has printed thereon an encoded pattern of location information for use by a pen computer device and wherein further said encoded pattern of location information defines a portion of a dot space;
   recognizing said first image wherein said first image identifies a web page comprising a plurality of second images and a plurality of memory-stored content associated with said plurality of second images; and
   associating said portion of said dot space with said web page, wherein said scanning, said recognizing and said associating are performed by said pen computer device.

23. A method as described in claim 22 further comprising, in response to said pen computer device selecting a selected one of said second images, performing an action related to a memory-stored content that is associated with said selected one of said plurality of second images.

24. A method as described in claim 23 wherein said action is audibly rendering a recording.

25. A method as described in claim 22 further comprising, in response to said pen computer device selecting a selected one of said second images, accessing a memory-stored content that is associated with said selected one of said plurality of second images.

26. A method as described in claim 25 wherein said memory-stored content that is associated with said selected one of said plurality of second images is a universal resource locator.

27. A method as described in claim 22 wherein said first image is a bar code image.

28. A method as described in claim 22 further comprising:
  printing said plurality of second images on said surface; and
  printing said first image on said surface.

29. A method as described in claim 28 further comprising loading said plurality of memory-stored content that is associated with said plurality of second images onto a memory of said pen computer device.

30. A method as described in claim 29 wherein said printings and said loading occur substantially contemporaneously.

* * * * *